US012724669B2

(12) United States Patent
Palmer et al.

(10) Patent No.: US 12,724,669 B2
(45) Date of Patent: Sep. 1, 2026

(54) CRYPTOGRAPHIC DATA INTEGRITY PROTECTION

(71) Applicant: Micron Technology, Inc., Boise, ID (US)

(72) Inventors: David Aaron Palmer, Boise, ID (US); Nadav Grosz, Broomfield, CO (US); Lance W. Dover, Fair Oaks, CA (US); Yoav Weinberg, Thornhill (CA)

(73) Assignee: Micron Technology, Inc., Boise, ID (US)

(*) Notice: Subject to any disclaimer, the term of this patent is extended or adjusted under 35 U.S.C. 154(b) by 28 days.

(21) Appl. No.: 19/030,342

(22) Filed: Jan. 17, 2025

(65) Prior Publication Data

US 2025/0238321 A1 Jul. 24, 2025

Related U.S. Application Data

(63) Continuation of application No. 18/206,398, filed on Jun. 6, 2023, now Pat. No. 12,499,010, which is a (Continued)

(51) Int. Cl.

*G06F 11/00* (2006.01)
*G06F 11/07* (2006.01)

(Continued)

(52) U.S. Cl.

CPC ...... *G06F 11/1068* (2013.01); *G06F 11/0772* (2013.01); *G06F 11/3037* (2013.01);

(Continued)

(58) Field of Classification Search

CPC ..................................................... G06L 1/1068

See application file for complete search history.

(56) References Cited

U.S. PATENT DOCUMENTS 7,136,995 B1 * 11/2006 Wann ...................... H04L 9/065 380/42
8,392,798 B2 * 3/2013 Flynn ................. G06F 16/9014 714/763

(Continued)

FOREIGN PATENT DOCUMENTS

| | | | |
|---|---|---|---|
| CN | 102317919 | A | 1/2012 |
| CN | 105144302 | A | 12/2015 |
| CN | 113127893 | A | 7/2021 |

OTHER PUBLICATIONS

"Chinese Application Serial No. 202011534578.7, Decision of Rejection mailed Apr. 3, 2024", with English translation, 14 pages.

(Continued)

*Primary Examiner* — Amine Riad
(74) *Attorney, Agent, or Firm* — Schwegman Lundberg & Woessner, P.A.

(57) ABSTRACT

A storage device includes a memory storage region and a controller having a processor. The processor retrieves user data from the memory storage region using a physical block address corresponding to a logical block address (LBA), in response to a read command. The retrieved user data includes a first hash received through a host interface in a prior host data transmission. The processor further performs error correction on the user data to generate error-corrected user data. The processor further causes a cryptographic engine to produce a second hash of the error-corrected user data. The first hash is compared to the second hash associated with the error-corrected user data to determine a match result. A notification is generated in response to the match result.

20 Claims, 10 Drawing Sheets

Related U.S. Application Data continuation of application No. 17/014,771, filed on Sep. 8, 2020, now Pat. No. 11,693,732.

(60) Provisional application No. 62/955,637, filed on Dec. 31, 2019.

(51) Int. Cl.

| | |
|---|---|
| ***G06F 11/10*** | (2006.01) |
| ***G06F 11/30*** | (2006.01) |
| ***G06F 12/02*** | (2006.01) |
| ***G06F 12/14*** | (2006.01) |
| ***G06F 13/42*** | (2006.01) |
| ***G06F 21/64*** | (2013.01) |

(52) U.S. Cl.

CPC ...... *G06F 12/0246* (2013.01); *G06F 12/1408* (2013.01); *G06F 13/4221* (2013.01); *G06F 21/64* (2013.01); *G06F 2212/7201* (2013.01)

(56) References Cited

U.S. PATENT DOCUMENTS

| | | | | |
|---|---|---|---|---|
| 9,152,502 | B2 * | 10/2015 | Kalach | G06F 11/1435 |
| 9,606,870 | B1 * | 3/2017 | Meiri | G06F 11/2069 |
| 10,254,972 | B2 | 4/2019 | Iwai | |
| 10,313,129 | B2 * | 6/2019 | Gopal | G06F 9/30007 |
| 11,526,300 | B2 * | 12/2022 | Segev | G06F 21/78 |
| 11,693,732 | B2 | 7/2023 | Palmer et al. | |
| 2014/0056068 | A1 * | 2/2014 | Strasser | G11C 16/3418 365/185.03 |
| 2014/0160591 | A1 | 6/2014 | Sakamoto et al. | |
| 2014/0181575 | A1 | 6/2014 | Kalach et al. | |
| 2014/0317479 | A1 | 10/2014 | Candelaria | |
| 2019/0188331 | A1 * | 6/2019 | Lee | G06F 12/1018 |
| 2021/0200631 | A1 | 7/2021 | Palmer et al. | |
| 2023/0315569 | A1 | 10/2023 | Palmer et al. | |

OTHER PUBLICATIONS

"Chinese Application Serial No. 202011534578.7, Office Action mailed Oct. 16, 2023", with English translation, 13 pages.

"Chinese Application Serial No. 202011534578.7, Response filed Feb. 27, 2024 to Office Action mailed Oct. 16, 2023", with English claims, 182 pages.

"Chinese Application Serial No. 202011534578.7, Response filed Jun. 27, 2024 to Decision of Rejection mailed Apr. 3, 2024", with English claims, 27 pages.

* cited by examiner

CRYPTOGRAPHIC DATA INTEGRITY PROTECTION

PRIORITY APPLICATION

This application is a continuation of U.S. application Ser. No. 18/206,398, filed Jun. 6, 2023, which is a continuation of U.S. application Ser. No. 17/014,771, filed Sep. 8, 2020, now issued as U.S. Pat. No. 11,693,732, which claims the benefit of priority to U.S. Application Ser. No. 62/955,637, filed Dec. 31, 2019, all of which are incorporated herein by reference in their entirety.

Embodiments of the disclosure relate generally to improving data integrity characteristics of memory storage systems, and more specifically, to cryptographic data integrity protection.

BACKGROUND

Memory devices are typically provided as internal, semiconductor, integrated circuits in computers or other electronic devices. There are many different types of memory, including volatile and non-volatile memory. Volatile memory requires power to maintain its data and includes random-access memory (RAM), in various forms, such as dynamic random-access memory (DRAM), or synchronous dynamic random-access memory (SDRAM), among others. Non-volatile memory may retain stored data when not powered (may be implemented as read-only memory (ROM) in some cases) and may include one or more storage technologies, such as flash memory (e.g., NAND or NOR flash), electrically erasable programmable ROM (EEPROM), Ferroelectric RAM (FeRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others. Systems incorporating memory may include multiple memory devices or memory systems implementing multiple storage technologies.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Data integrity (i.e., ensuring stored data are reliable and accurate over their entire lifecycle) and data security are becoming increasingly important as data center technologies and Internet-of-Things (IoT) communications further develop. Even cognizant of existing protection mechanisms (e.g., end-to-end cyclic redundancy check (CRC)/parity/error-correcting codes, etc.), in this era of increasing security needs, customers are demanding stronger verification mechanisms to verify that data previously written to storage devices has not been changed either maliciously or inadvertently.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
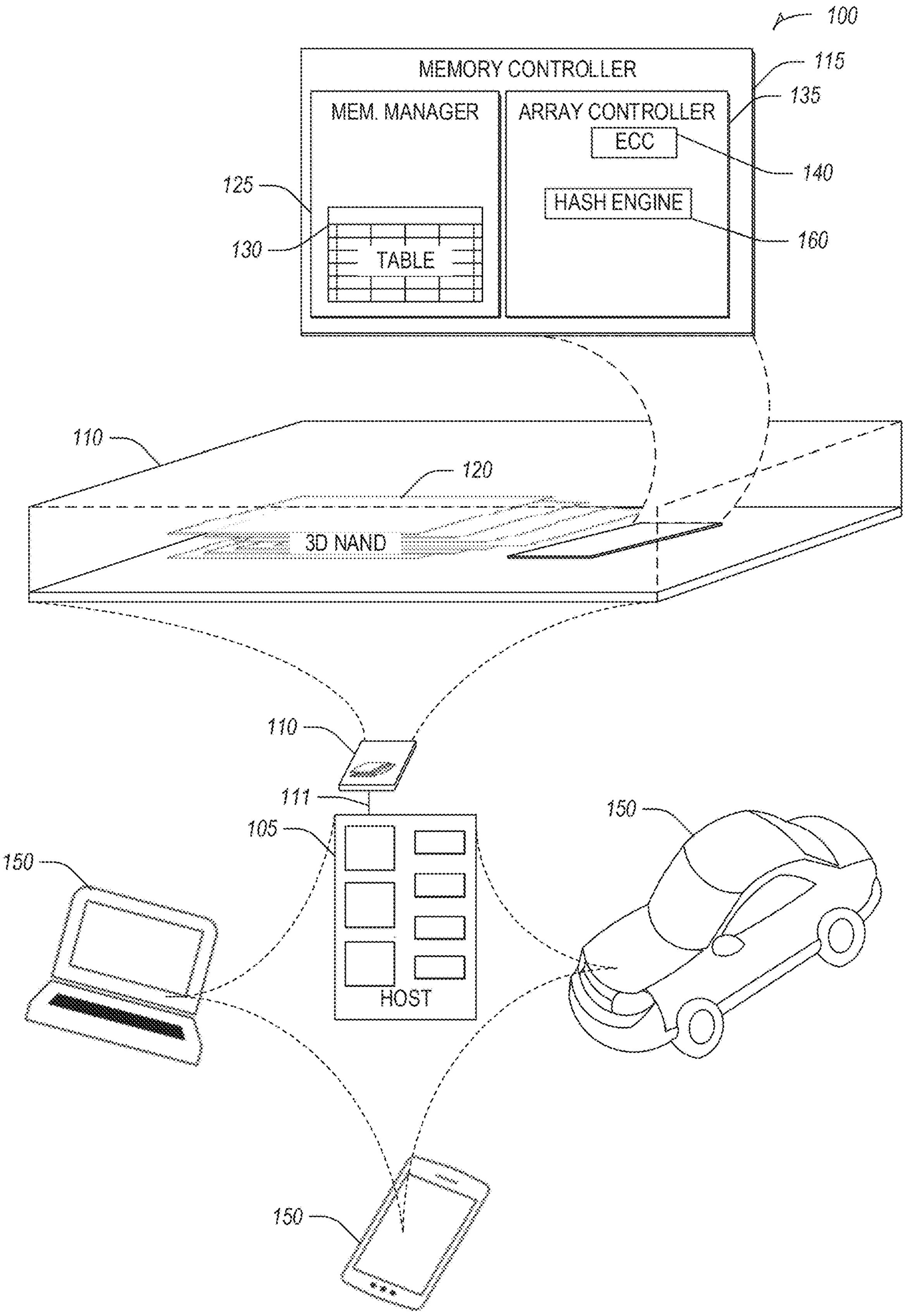
FIG. 1 illustrates an example of an environment including a memory device with a cryptographic engine.

Block storage devices incorporate many mechanisms for protecting data integrity. However, as security becomes increasingly important, customers desire stronger forms of data integrity verification based on high-strength cryptographic verification. The present document describes examples of memory devices, systems, methods, and machine-readable mediums for providing real-time cryptographic validity checking of data written to, and read from, a storage device. More specifically, techniques disclosed herein provide a mechanism by which a host can write data to a storage device and provide a cryptographic token (e.g., a hash) associated with the data. The cryptographic token can then be used at the time the data is read back by the host, to attest in real-time that the data is unchanged. This ensures that data integrity has been preserved from the time the data is written to the storage device until the time the data is read back by the host. In some aspects, the writing/reading of the token may take place atomically, without multiple cycles, thereby essentially preserving the existing memory device performance. Such functionality may be enabled by allowing the digest to be associated with the memory in its spare area and written/read as a single unit.

During the data write operation, the host provides the data together with a cryptographic token associated with the data. For example, the cryptographic token can include a keyed-hash message authentication code (HMAC), such as HMAC-SHA256, which has been generated by the host using the data. The storage device stores the write data and the cryptographic token received from the host in memory. When the host requests the written data by communicating a read request, the storage device calculates a new cryptographic token based on the data read back from the memory. The new cryptographic token is then compared with the host-provided cryptographic token in order to ascertain the data integrity of the stored data. These operations can be performed by intercepting the data being read from the media before transmission to the host in order to reduce latency in the read operation. The requested data can be communicated back to the host when the new cryptographic token matches the host-provided cryptographic token. When the two tokens do not match, a failure notification can be generated and communicated to the host in lieu of (or together with) the requested data.

In this regard, the techniques disclosed herein provide a lightweight-to-the-host mechanism for the host to write data and provide associated cryptographic tokens for that data, and for the storage device to automatically verify that read data provided back to the host is the same data previously provided by the host, with a level of certainty derived from high-strength cryptography. Mobile devices (e.g., iOS-based or Android-based mobile devices) can employ the techniques discussed herein when writing system files in storage, and then during boot or load of the files received back from storage, the cryptographic integrity of the files can be verified prior to use.

Memory devices include individual memory die, which may, for example, include a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control the operation of the one or more memory die. Such controller functionality can simplify interoperability with an external device, such as a "host" as discussed later herein. In such managed memory devices, the controller functionality may be implemented on one or more die also incorporating a memory array or on a separate die). In other examples, one or more memory devices may be combined with controller functionality to form a solid-state drive (SSD) storage volume.

Embodiments of the present disclosure are described in the example of managed memory devices implementing NAND flash memory cells, termed "managed NAND" devices. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. More specifically, flash memory cells use threshold voltages (Vth) to represent data information. The Vth of each state in flash memory can be fixed by, e.g., a memory controller so that each memory state (i.e., a data pattern) represents a particular threshold voltage level. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can refer to a memory cell that can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, an embedded Multimedia Card (MMC) device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard. Similarly, identified eMMC devices may be configured in accordance with JEDEC standard JESD84-A51, entitled "JEDEC eMMC standard 5.1", and/or updates or subsequent versions to such standard.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delays associated with magnetic disk drives (e.g., electromechanical, etc.). SSDs use non-volatile memory cells, such as flash memory cells, to obviate internal battery supply requirements, thus allowing the drive to be more versatile and compact. Managed NAND devices can be used as primary or ancillary memory in various forms of electronic devices and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array and either within or separate from a controller. Both SSDs and managed NAND devices can receive commands from a host in association with memory operations, such as read or write operations to transfer data (e.g., user data and associated integrity data, such as error data and address data, etc.) between the memory devices and the host or erase operations to erase data from the memory devices.

In the case of flash storage devices, such as NAND memory, the memory devices may only be written for a limited number of times (e.g., for a certain number of program/erase (P/E) cycles). At the end of a flash device's usage life, data may be corrupted, or the device may be rendered unusable if measures are not proactively taken to manage the device's lifespan. In NAND flash memory cells, electrons are trapped to the memory cell each time when data is written (e.g., via a programming operation), and electrons are taken off when data is removed (e.g., via an erasure operation). Electrons going in and out through the tunnel oxide during a P/E cycle may wear out the tunnel oxide and thus reduce the device's lifetime.

The P/E cycles may be used to quantify the endurance of a flash device. Endurance may be expressed as a drive writes per day (DWPD), which measures how many times a host can overwrite the drive's entire size each day of its life. For example, for an SSD with a size of 200 GB and a warranty period of 5 years, if DWPD is 1, then 200 GB can be written into the device every day for the next five years. That corresponds to 200 GB×365 days×5 years=365 TB of cumulative writes before the device is expected to fail. If DWPD is 10, then every single day 10×200 GB=2 TB can be written into the device. Endurance may alternatively be expressed as terabytes written (TBW), which measures total data writable into the drive over its lifetime. For example, for an SSD rated for 365 TBW, up to 365 TB data can be written before the drive is set for replacement. The guaranteed TBW can be provided by the vendor in their specifications. A target writes per day can be calculated using the TBW and target lifetime (e.g., a warranty of target lifetime such as 3-5 years). For example, for an SSD with a TBW of 120 TB and a warranty period of 3 years, target daily writes may be calculated as 120 TB/3 years/365 days/1024=110 GB per day.

Normal operation of flash memory may involve a large amount of writing (programming) and erasure of memory cells. Garbage collection (GC) is an operation to manage memory utilization in flash memory. When the free physical space in a flash memory gets low, GC can recover free space on the storage device to allow for new host data to be written. During GC, a flash block that contains pages with valid data and pages with stale data (garbage) is read. Pages with the valid data are preserved, by writing to another fresh block. The logical block address is then updated with the new location. Pages with stale data marked for deletion remain on the location in the old block. Then, the entire old block (that contains pages with the stale data) is erased. The erased block can be added to the free block pool and used for a new incoming write. Such data written to pages and block erasure can lead to write amplification (WA). A numerical WA metric can be determined using a ratio of the amount of data physically written to the flash memory (physical writes) to the amount of data the host originally intended to write (host writes). The actual physical writes are generally larger than the host writes, resulting in a WA metric greater than one.

The GC operation can consume a lot of read/write bandwidth in flash memory. As GC takes valid data already written by the host and rewrites them again, a large WA may result. The repeated physical act of moving data can degrade or wear out the insulator layer of tunnel oxide, reduce NAND flash lifespan, and slow down the device's erase process. When a block fails to erase, a spare block needs to be used. Eventually, when the spares run out, the SSD can fail. Additionally, if performed concurrently with host operations, GC can significantly degrade device performance and user experience. Moreover, if the GC operation is performed all the time, the storage device would consume all its available life very quickly, leading to an unusably short lifetime.

Various memory management approaches have been proposed to reduce or mitigate flash memory wear-out, such as due to GC, and to maintain a desirable device lifespan. One approach, referred to as over-provisioning (OP), attempts to preserve a dedicated portion of the storage capacity for GC usage. The preserved storage is generally not accessible or usable by the host. With a higher OP and thus a smaller WA, degradation of the NAND device can be decreased and the device lifetime can be extended. However, the benefit of a higher OP level is at the cost of less useable or accessible storage space to the host and thus reduced performance of the managed NAND device. Another approach is wear leveling, which involves evenly distributing P/E cycles to available cells to avoid overusing certain blocks. Frequently writing to or erasing the same blocks leads to more bad blocks, eventually wearing out the NAND device. Yet another solution to the wear-out due to GC is by using a TRIM command that allows the host operating system to inform the managed NAND device about the location of stale data marked for deletion. The device then accesses the stale data to perform GC on a page level instead of managing whole blocks, thereby reducing WA and increasing SSD endurance.

In the following detailed description, reference is made to the accompanying drawings that form a part hereof and in which is shown, by way of illustration, specific embodiments. In the drawings, like numerals describe substantially similar components throughout the several views. Other embodiments may be utilized, and structural, logical, and electrical changes may be made without departing from the scope of the present disclosure. The following detailed description is, therefore, not to be taken in a limiting sense.

Although embodiments are discussed in this document with reference to NAND media, said embodiments are not limited to NAND media and may be applied to NOR media. Furthermore, although embodiments are discussed primarily in reference to managed NAND devices, the described embodiments may alternatively be implemented with other types of non-volatile storage technologies such as nanowire memory, FeRAM, MRAM, flash memory, Spin Torque Transfer Random Access Memory (STTRAM), RRAM, byte-addressable 3-Dimensional Cross Point Memory (3D X-Point), PCM (Phase Change Memory), etc.

FIG. 1 illustrates an example of an environment 100 including a host device 105 and a memory device 110 configured to communicate over an interface 111. The host device 105 or the memory device 110 may be included in a variety of products 150, such as IoT devices (e.g., a refrigerator or other appliance, a sensor, a motor or an actuator, a mobile communication device, an automobile, a drone, etc.) to support processing, communications, or control of the product 150.

The memory device 110 includes a memory controller 115 and a memory array 120. The memory array 120 may include a number of individual memory die (e.g., a two-dimensional (2D) NAND die, or a stack of 3D NAND die). The memory arrays 120 can be 2D structures arranged on a surface of a semiconductor substrate. To increase memory capacity for a given area, and to decrease cost, the size of the individual memory cells can be decreased. Alternatively, memory arrays 120 can be 3D structures, such as 3D NAND memory devices that can further increase memory density and lower memory costs.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs), metal-oxide semiconductor (MOS) structure devices, etc. In some examples, the strings will extend vertically, through multiple vertically spaced tiers containing respective word lines. A semiconductor structure may extend adjacent a string of storage cells to form a channel for the storage cells of the string. In the example of a vertical string, the polysilicon structure may be in the form of a vertically extending pillar. In some examples, the string may be "folded" and thus arranged relative to a U-shaped pillar. In other examples, multiple vertical structures may be stacked upon one another to form stacked arrays of storage cell strings.

In 3D architecture semiconductor memory technology, vertical structures are stacked, increasing the number of tiers, physical pages and, accordingly, the density of a memory device (e.g., a storage device). In an example, the memory device 110 can be a discrete memory or storage device component of a host device. In other examples, the memory device 110 can be a portion of an integrated circuit (e.g., system on a chip (SOC), etc.), stacked or otherwise included with one or more other components of a host device.

The memory controller 115 can communicate with the memory array 120, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, or components configured to control access across the memory array 120 and to provide a translation layer between a host and the memory device 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., GC or reclamation), error detection or correction, block retirement, or one or more other memory management functions. The memory manager 125 can parse or format host commands (e.g., commands received from the host 105 via the interface 111) into device commands (e.g., commands associated with operation of a memory array, etc.), or generate device commands (e.g., to accomplish various memory management functions) for the array controller 135 or one or more other components of the memory device 110.

The interface 111 provides a hardware communications medium between the storage device 110 and components of the host 105. In an example, the interface 111 is a JEDEC memory standards interface. In an example, the storage device 105 is a flash device. In an example, the interface 111 conforms to at least one of an Integrated Device Electronics (IDE) AT Attachment (ATA) interface, a serial ATA (SATA) interface, a Small Computer System Interface (SCSI) interface, a UFS interface, an eMMC interface, or Non-Volatile Memory Host Controller Interface Specification (NVMHCI) interface.

The memory manager 125 can include a set of management tables 130 configured to maintain various information associated with one or more components of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between a host and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The array controller can also include a hash engine 160, which is configured to generate a hash associated with data (e.g., a hash associated with read data in connection with real-time integrity checking of the data). In some examples, the hash can be a hash of the data based on a secure key (e.g., a key shared between the host 105 and the memory device 110). For example, the hash can be a keyed HMAC. An HMAC is a message authentication code (MAC) where a key (e.g., the key shared between the host 105 and the memory device 110) is combined with the data to produce the hash. HMACs can be used to verify one or both of data integrity and authenticity of data. In some examples, the hash engine 160 is configured to generate a cryptographic hash. In an example embodiment, the cryptographic hash is a secure hash algorithm (SHA), such as SHA-2 or SHA-3. In an example embodiment, the hash engine 160 is arranged to produce a 256 bit hash, such as HMAC-SHA256. Even though the hash engine 160 is illustrated as being part of the memory controller 115, the disclosure is not limited in this regard and the hash engine 160, as well as other processing circuitry configured to perform one or more of the functionalities discussed herein (e.g., a decoder), can be part of the memory device 110 and implemented separately from memory controller 115. In some examples, the hash engine 160 can be placed between the ECC 140 and the host interface 111 to inline the integrity operation, in a way that minimizes latency for such operation.

In some examples, the memory array 120 may comprise a number of NAND dies, and one or more functions of the memory controller 115 for a particular NAND die may be implemented on an on-die controller on that particular die. Other organizations and delineations of control functions may also be utilized, such as a controller for each die, plane, superblock, block, page, and the like.

The memory array 120 can include several memory cells arranged in, for example, a number of devices, semi-conductor dies, planes, sub-blocks, blocks, or pages. In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of ECC data than a memory device with a lower bit error rate). As an example, an MLC NAND flash device may have a higher bit error rate than a corresponding SLC NAND flash device. As such, the MLC device may require more metadata bytes for error data than the corresponding SLC device.

In some examples, the memory controller 115 is configured (e.g., hardware and/or software implementation) to perform one or more of the techniques discussed herein for real-time cryptographic validity checking of data written to, and read from, the memory device 110, including the exemplary techniques discussed herein in connection with FIG. 3-FIG. 9. For example, the memory controller 115 can store instructions for performing the techniques discussed herein for real-time cryptographic validity checking of data. In some examples, the instructions can be included as firmware within the array controller 135, such as firmware implementing the hash engine 160.

In some examples, the memory controller 115 is configured to process a data write request received from a host, which includes the data as well as an original hash generated based on the data and a shared key for purposes of real-time integrity checking at data read time. Processing of the data write request, as well as different options for communicating the original hash and storing the data with its corresponding original hash, are discussed in greater detail in connection with FIG. 3-FIG. 6. In some examples, the memory controller is configured to process a data read request from a host, including retrieving the data from storage as well as the original hash corresponding to the retrieved data, generating a new hash (e.g., using the hash engine 160) based on the retrieved data, and performing a comparison between the original hash and the newly generated hash to perform real-time integrity checking of the data. Additional details regarding examples of the data read request processing and performing the real-time integrity checking of the data are provided in connection with FIG. 7 and FIG. 8.

Figure 2:
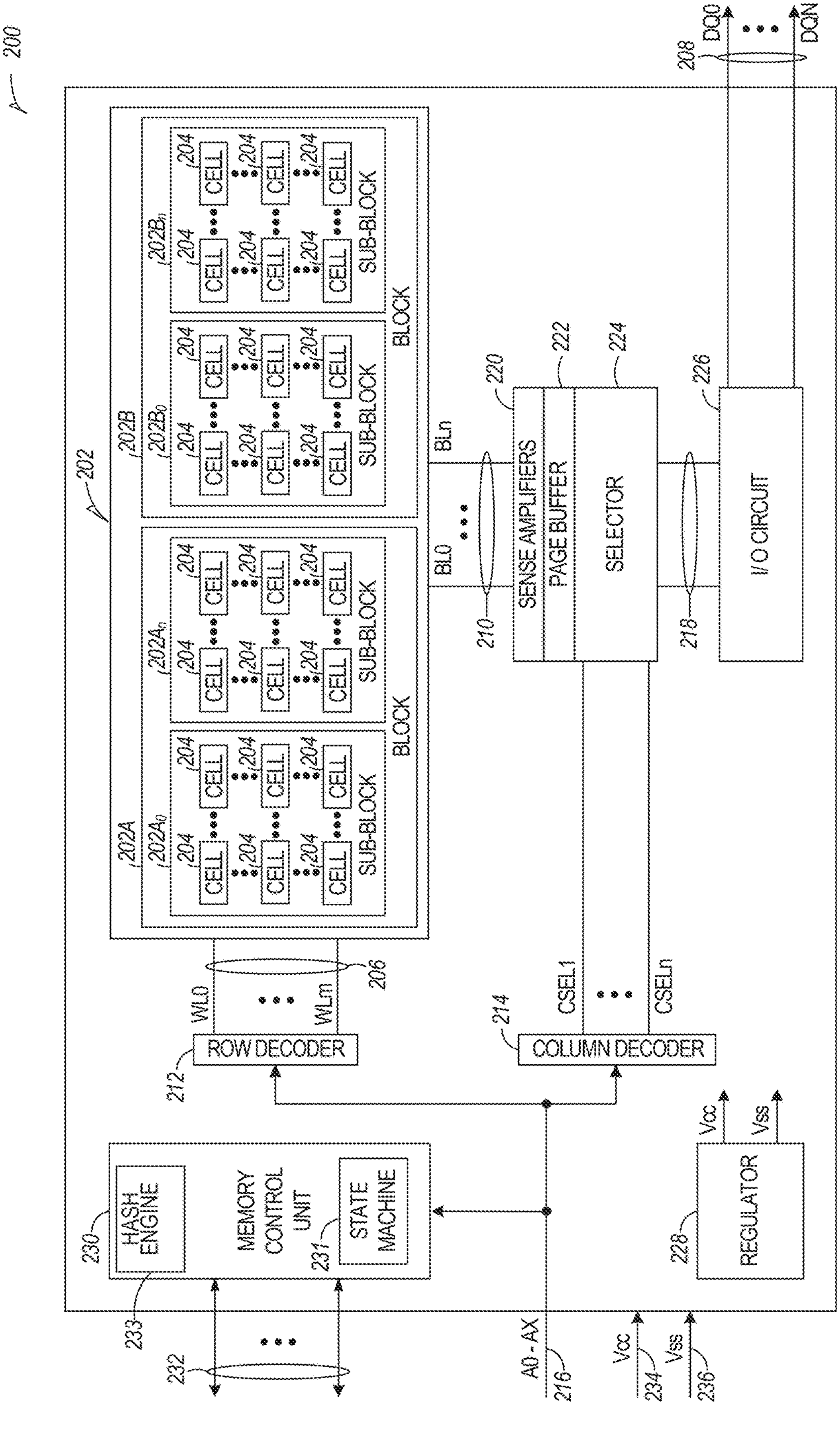
FIG. 2 is a block diagram illustrating an example of a memory module.

FIG. 2 is a block diagram illustrating an example of a memory device 200 including a memory array 202 having a plurality of memory cells 204, and one or more circuits or components to provide communication with, or perform one or more memory operations on, the memory array 202. The memory device 200 can include a row decoder 212, a column decoder 214, sense amplifiers 220, a page buffer 222, a selector 224, an I/O circuit 226, and a memory control unit 230.

The memory cells 204 of the memory array 202 can be arranged in blocks, such as first and second blocks 202A, 202B. Each block can include sub-blocks. For example, the first block 202A can include first and second sub-blocks 202$A_0$, 202$A_n$, and the second block 202B can include first and second sub-blocks 202$B_0$, 202$B_n$. Each sub-block can include a number of physical pages, with each page including a number of memory cells 204. Although illustrated herein as having two blocks, with each block having two sub-blocks, and each sub-block having a number of memory cells 204, in other examples, the memory array 202 can include more or fewer blocks, sub-blocks, memory cells, etc. In other examples, the memory cells 204 can be arranged in a number of rows, columns, pages, sub-blocks, blocks, etc., and accessed using, for example, access lines 206, first data lines 210, or one or more select gates, source lines, etc.

The memory control unit 230 can control memory operations of the memory device 200 according to one or more signals or instructions received on control lines 232, including, for example, one or more clock signals or control signals that indicate the desired operation (e.g., write, read, erase, etc.) or address signals (A0-AX) received on one or more address lines 216. One or more devices external to the memory device 200 can control the values of the control signals on the control lines 232 or the address signals on the address line 216. Examples of devices external to the memory device 200 can include but are not limited to, a host, a memory controller, a processor, or one or more circuits or components not illustrated in FIG. 2.

Figure 3:
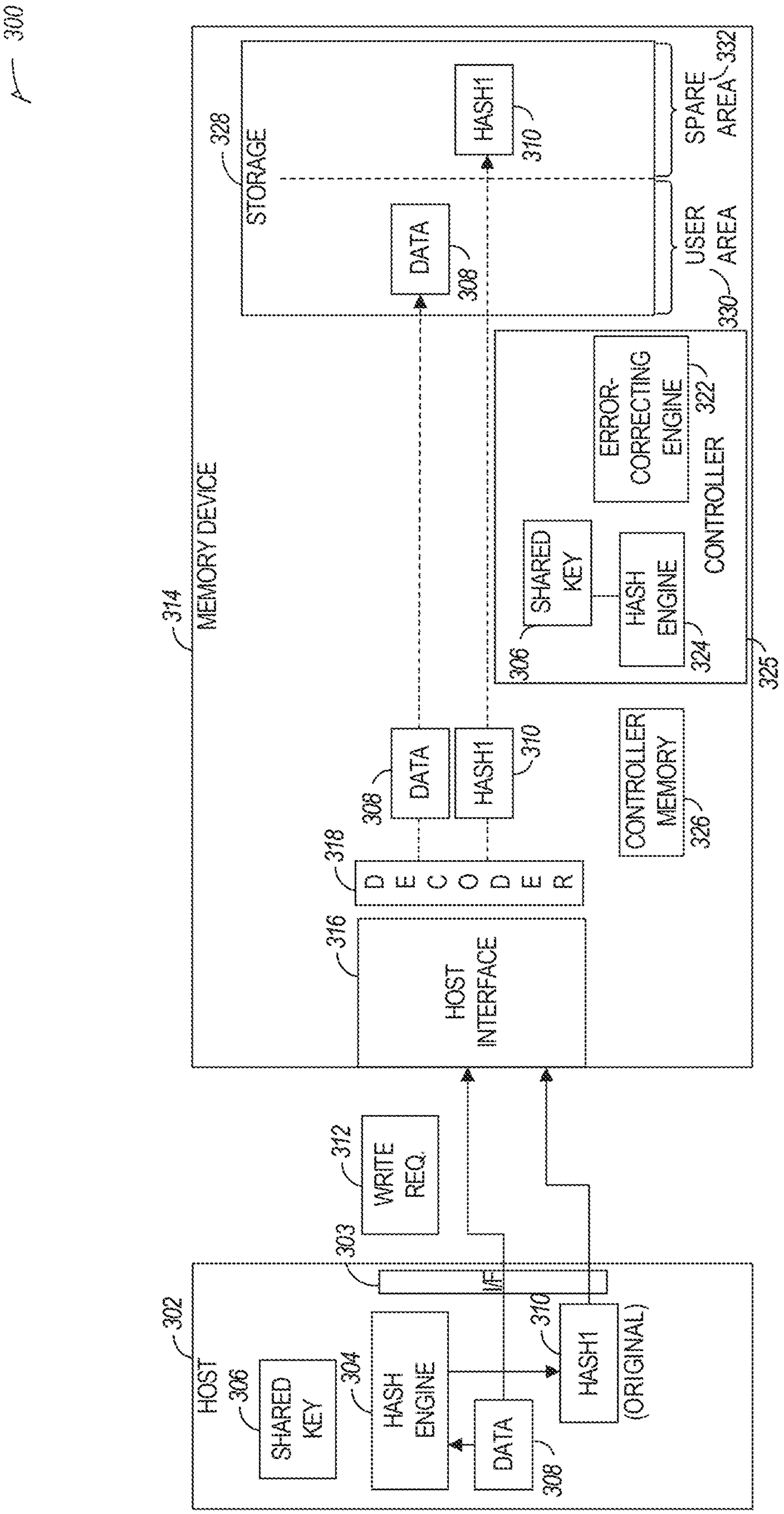
FIG. 3 is a block diagram illustrating an example memory device configured to process a data write request includes an original hash.
Figure 7:
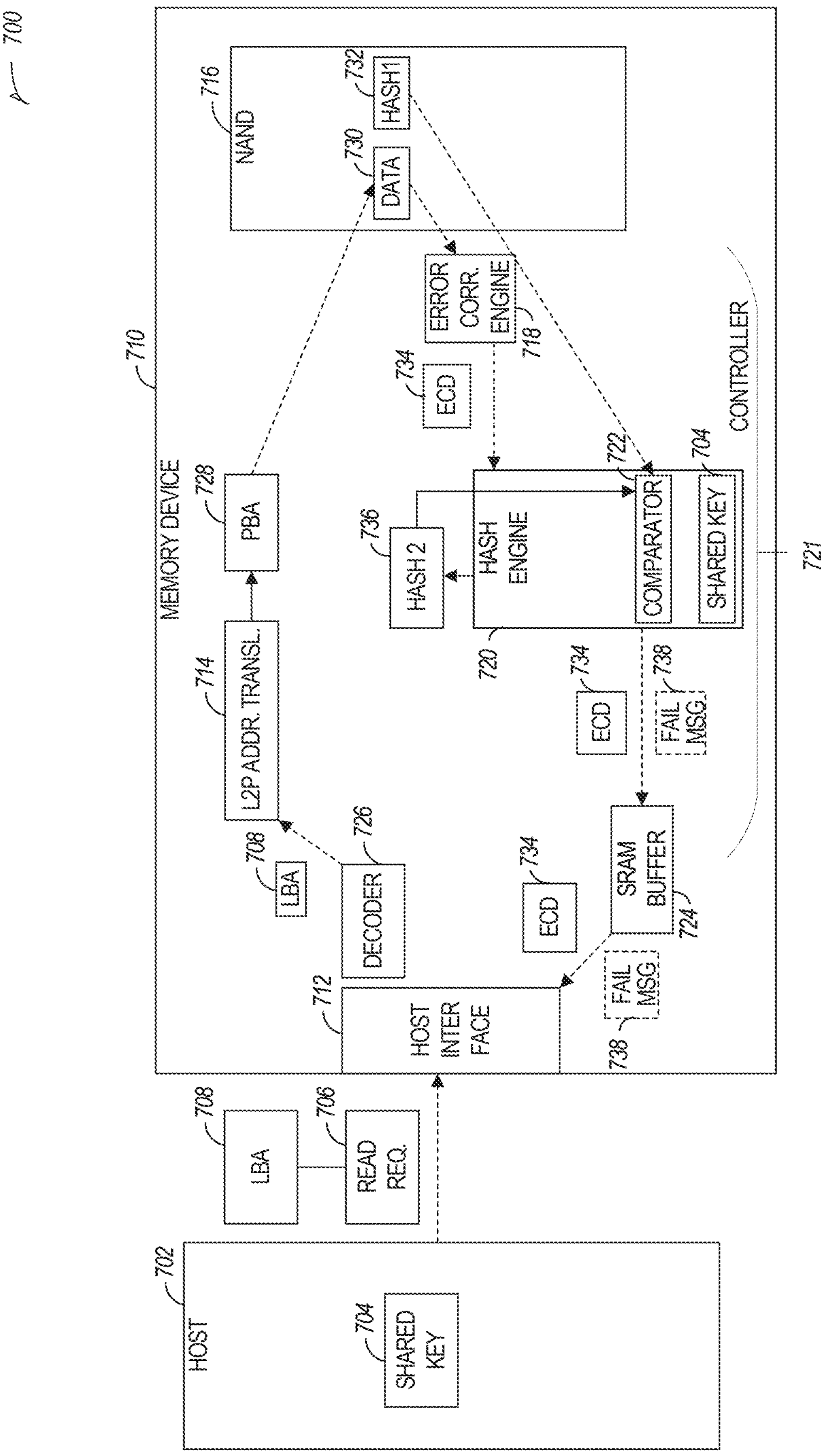
FIG. 7 is a block diagram illustrating an example memory device configured to process a data read request with real-time time integrity checking.

In some examples, the memory control unit 230 is configured to include a hash engine 233, which can be similar in functionality to the hash engine 160 or any of the hash engines illustrated in FIG. 3 and FIG. 7.

The memory device 200 can use access lines 206 and first data lines 210 to transfer data to (e.g., write or erase) or from (e.g., read) one or more of the memory cells 204. The memory control unit 230 may include a state machine 231 coupled to the row decoder 212, the column decoder 214, and the I/O circuit 226. The state machine 231 can also output status data of the flash memory such as READY/BUSY or PASS/FAIL. In some designs, the state machine 213 can be configured to manage the programming process. The row decoder 212 and the column decoder 214 can receive and decode the address signals (A0-AX) from the address line 216, determine which of the memory cells 204 are to be accessed, and provide signals to one or more of the access lines 206 (e.g., one or more of a plurality of word lines (WL0-WLm)) or the first data lines 210 (e.g., one or more of a plurality of bit lines (BL0-BLn)), such as described above.

The memory device 200 can include sense circuitry, such as the sense amplifiers 220, configured to determine the values of data on (e.g., read), or to determine the values of data to be written to, the memory cells 204 using the first data lines 210. For example, in a selected string of memory cells 204, one or more of the sense amplifiers 220 can read a logic level in the selected memory cell 204 in response to a read current flowing in the memory array 202 through the selected string to the data lines 210.

One or more devices external to the memory device 200 can communicate with the memory device 200 using the I/O lines (DQ0-DQN) 208, address lines 216 (A0-AX), or control lines 232. The input/output (I/O) circuit 226 can transfer values of data in or out of the memory device 200, such as in or out of the page buffer 222 or the memory array 202, using the I/O lines 208, according to, for example, the control lines 232 and address lines 216. The page buffer 222 can store data received from the one or more devices external to the memory device 200 before the data is programmed into relevant portions of the memory array 202 or can store data read from the memory array 202 before the data is transmitted to the one or more devices external to the memory device 200.

The column decoder 214 can receive and decode address signals (A0-AX) into one or more column select signals (CSEL1-CSELn). The selector 224 (e.g., a select circuit) can receive the column select signals (CSEL1-CSELn) and select data in the page buffer 222 representing values of data to be read from or to be programmed into memory cells 204. Selected data can be transferred between the page buffer 222 and the I/O circuit 226 using second data lines 218. In some examples, a flash translation layer (not shown) can map addresses provided by a host to physical memory addresses used by the row decoder 212 and column decoder 214 to read data in the memory array 202.

The memory control unit 230 can receive positive and negative supply signals, such as a supply voltage Vcc 234 and a ground potential Vss 236, from an external source or supply (e.g., an internal or external battery, an alternating current to direct current (AC-to-DC) converter, etc.). In certain examples, the memory control unit 230 can include a regulator 228 to internally provide positive or negative supply signals.

As previously described, a memory cell of a memory device can be arranged as either an SLC configured to store only a single bit of data or an MLC that stores two or more bits of data. For example, a TLC can store three bits of data per cell, and a QLC can store four bits of data per cell. Compared to MLC (e.g., TLC or QLC) storage, SLC cells generally store less data, and manufacturing memory devices in capacities suitable for use as a storage device using just SLC memory cells is less cost-effective. However, SLC memory cells may offer better performance with higher reliability. For example, SLC cells may be written with fewer programming cycles, thereby reducing the chances of corruption from an unexpected power loss during programming. A compromise solution to memory management is using an SLC cache, where some cells may be configured as SLC and other cells as MLC. For example, data may be first written to the SLC, and later transferred to the MLC when the memory device is not busy (e.g., idle state). In some examples, when receiving a host write request, the memory controller can check if there is a free SLC cache. Data can then be written to the SLC cache, if there is a free SLC cache, or, instead, written to MLC storage directly if no free SLC cache is available. The SLC cache mechanism provides a balance between the speed and reliability of SLC memory cells with the storage capacity of MLC memory cells. In some example memory devices, the memory cells can be reconfigurable by firmware between SLC and MLC, and the cache size can vary during usage (dynamic size SLC cache). For example, the SLC cache size can vary based upon how full the memory device is (device utilization). As the device fills up, memory cells configured as SLC cache are migrated to MLC to increase total data storage capacity.

The use of SLC cache may lead to WA because the same data is written twice to the physical media of the flash memory: first to the SLC cache and then to the MLC storage. A WA metric can be determined as the actual amount of information physically written to the storage media relative to the logical amount that a host intends to write over the life of that data as it moves throughout the memory device. The larger the SLC cache, the more likely a write request is to be serviced by SLC cache, hence the greater the likelihood of an increase in WA. In addition to the use of SLC cache, GC may also lead to a large WA, as previously discussed.

FIG. 3 is a block diagram illustrating an example memory device configured to process a data write request includes an original hash. Referring to FIG. 3, the example environment 300 includes a host 302 and a memory device 314 configured for real-time integrity checking of data. The host 302 and the memory device 314 can be similar to host 105 and memory device 110 respectively.

The memory device 314 includes a host interface 316, a decoder 318, a memory controller 325, controller memory 326, and memory array 328 (e.g., a NAND flash memory array or another storage class memory). The memory controller 325 includes a hash engine 324 and an error-correcting engine 322, which can be configured to perform similar functions as hash engine 160 and the ECC component 140 of FIG. 1. The host interface 316, which is similar to host interface 111 of FIG. 1, provides a hardware communications medium between the memory device 314 and components of the host 302.

The host 302 can be embedded into a manufactured good (e.g., 150 in FIG. 1), where the manufactured good can include a variety of things, such as a vehicle (including unmanned vehicles), an appliance, furniture, a structure, a sensor, clothing, or other items in which the host 302 can be included (e.g., embedded). Recent trends to create "smart" items or add communication and security capabilities (e.g., data integrity checking) to goods that previously operated without such abilities, such as many appliances (e.g., refrigerators, washing machines, etc.) or sensors can be referred to as creating the IoT, with the participating goods being transformed into IoT devices.

The host 302 can include an interface 303 to communicate with one or more components of the manufactured good that are external to the host 302, such as the memory device 314. The host 302 can also include one or more processors (e.g., a central processing unit (CPU), a low-power processor, a digital signal processor, a graphics processing unit, etc.), and one or more storage devices (e.g., mass storage, memory, static memory, etc.), including the memory device 314. Host 302 can further include a hash engine 304 which can be configured to perform functionalities in connection with real-time integrity checking of data. More specifically, the hash engine 304 is configured to generate a hash 310 (also referred to as an "original hash" or a "first hash") associated with data 308. The hash 310 can be HMAC generated using data 308 and a secure key 306. The key 306 can be a shared key with the memory device 314 so that a copy of the key 306 is available to both hash engines 304 (within the host 302) and 324 (within the memory device 314).

The decoder 318 is arranged to parse a command/request (e.g., a write command or a read command) received at the interface 316 from the host 302. In an example, the decoder 318 is part of (e.g., integrated into) the controller 325.

The memory array 328 is accessible to an external entity (e.g., host 302) via the interface 316 to the memory device 314. Thus, in a typical operation of a flash device, for example, the memory array 328 can be used to hold data that external entities read from and write to via commands to the memory device 314 made via the interface 316. In contrast, the controller memory 326 would not generally be accessible to these external entities via the interface 316 but would rather be used by the controller 325 (or other portion of the memory device 314) for internal purposes. For example, controller 325 can use controller memory 326 to temporarily store data prior to communication to the host 302 via interface 316. Controller 325 can also use controller memory 326 as an SRAM buffer, to temporarily store hash and data received from the host 302, prior to storing such data in the memory array 328.

In an example, the memory array 328 is block addressable, such as a NAND flash device, a NOR flash device, or another type of flash memory. In an example, the controller memory 326 (illustrated as SRAM buffer in FIG. 3) is byte-addressable. Generally, though not exclusively, byte-addressable storage is used to store data immediately prior to consumption by a processor. Thus, data can be retrieved from non-byte addressable storage (e.g., block addressable storage such as memory array 328) into byte-addressable storage before being operated upon by a processor. Example byte-addressable media can include registers, RAM varieties (e.g., SRAM, DRAM, etc.), core memory, NOR flash, etc.

In operation, the hash engine 304 within host 302 generates an original hash 310 (also referred to as original HMAC data) associated with data 308 (also referred to as logical block address data, or LBA data) and using the shared key 306. As used herein, the term "LBA data" refers to user data that the LBA points to.

The host 302 communicates data 308 and hash 310 to the memory device 314 with a write command 312. The memory device 314 receives the write command 312 at the host interface 316, which is then parsed/decoded by decoder 318. Data 308 can be stored in a user area 330 of the memory array 328, and original hash 310 can be stored in a spare area 332 of the memory array 328.

In some examples, the original hash 310 can include metadata that associates data 308 with its storage address (e.g., logical storage address or LBA) at the memory array 328. Optionally, the metadata communicated as part of the hash 310 can include metadata to indicate time of write, hash version, a timestamp, or other versioning information, which can be used by the controller 325 to prevent replay/reuse of stale hash data.

In some examples, the following techniques can be used for storing the original hash with its metadata in the memory array 328. In some examples, the original hash 310 can be stored within a spare area 332 of the memory array 328. In some examples, the original hash 310 can be stored within a user area 330 of the memory array 328, with a predefined offset from the underlying data. In some examples, the original hash 310 can be stored within an inaccessible portion of the user data area 330.

In some examples, as data and corresponding hash information are received at the memory device 314, the controller 325 can maintain a register (e.g., at controller memory 326) with defined associations of HMAC data and LBA data. Once the original HMAC data 310 and the LBA data 308 is received at the memory device 314, the original HMAC data 310 may not be directly readable by the host 302.

Figure 5:
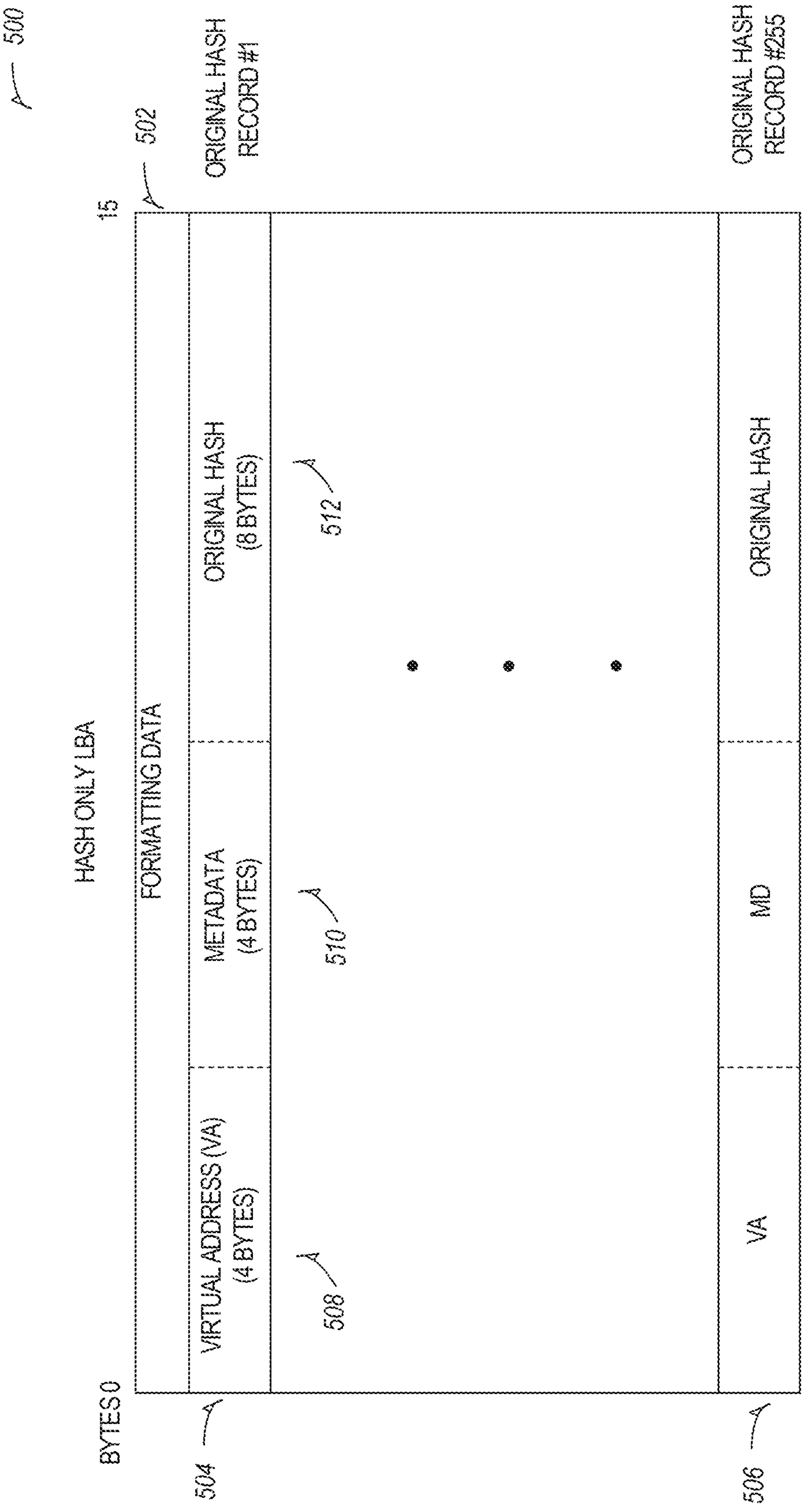
FIG. 5 is a block diagram illustrating an example hash only LBA, such as the LBA received in connection with FIG. 4.
Figure 6:
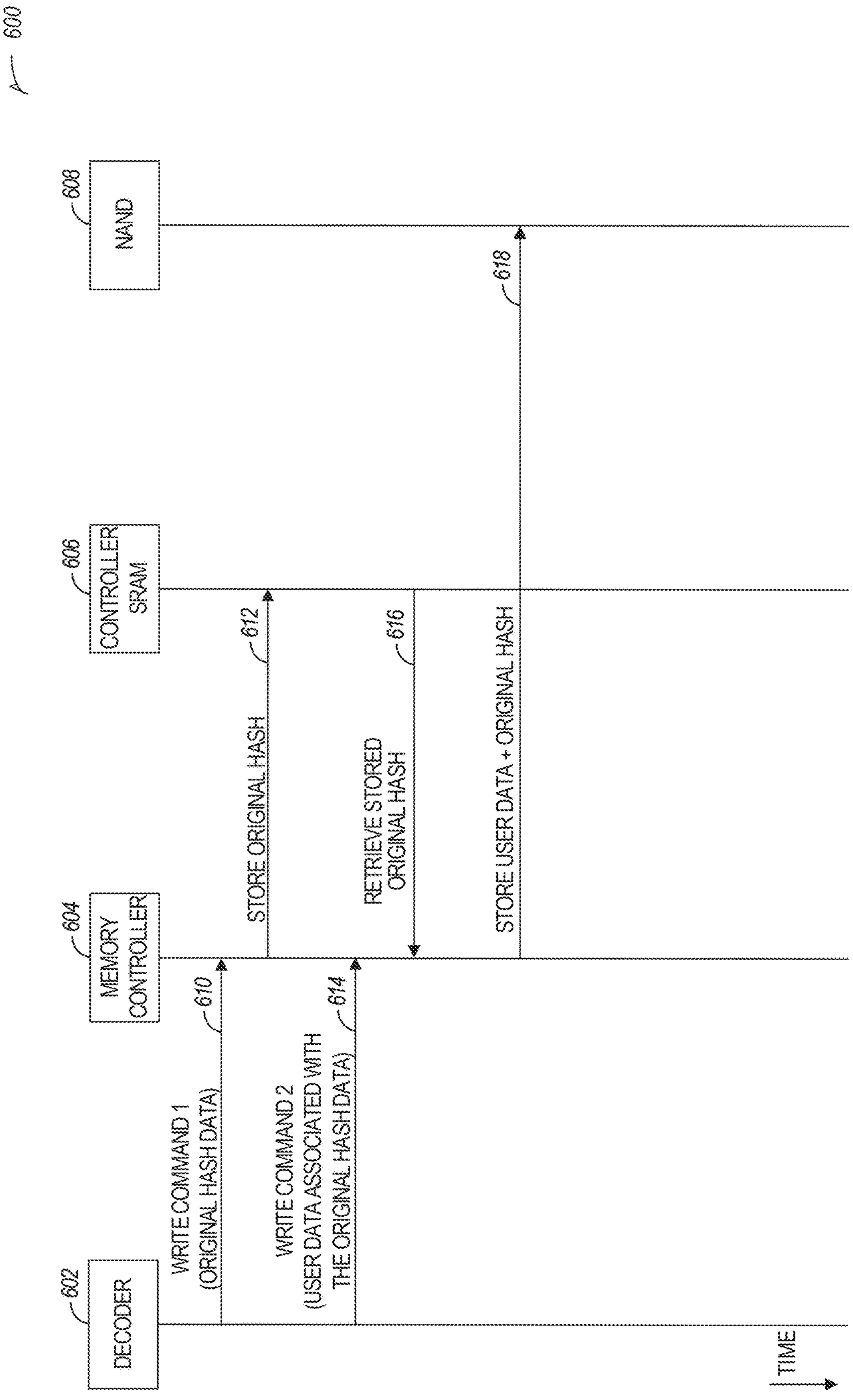
FIG. 6 is a swimlane diagram illustrating an example of component messaging within a memory device to process multiple write commands for storing LBA data and an original hash.

The following techniques may be used in connection with providing the HMAC data 310 and the LBA data 308 to the memory device 314. In some examples, the host 302 may initially authenticate the memory device 314 before sending the write command 312. During such authentication, the shared key 306 can be established and stored at both the host 302 and the memory device 314. In some examples, the host 302 can use a normal write command 312 or a custom secure write command 312. Additionally, the host 302 may provide the cryptographic token (e.g., original HMAC data 310) as an additional write command; as additional data included with the write command, using a vendor-specific or a custom security command; etc. In some examples, the original HMAC data 310 can be communicated to the memory device 314 using one or more of the following techniques: with additional LBA bytes (or a hash only LBA as illustrated in FIG. 5), with paired cycles (LBA then HMAC data, as illustrated in FIG. 6), or as part of a metadata field LBA that is cached. In some examples, the HMAC data in the LBA data can be stored in storage locations within the memory device 314 that is a function of the HMAC but are independent of the original address.

In some examples, during the initial authentication of the memory device 314, the host 302 can indicate one or more techniques used by the hash engine 304 to generate the original HMAC data 310. In this regard, through any mechanism by which the host 302 may generate the original HMAC data 310, the memory device 314 may optionally calculate a temporary HMAC upon receiving the incoming data 308 and original HMAC data 310. The memory device 314 (e.g., the controller 325) may then verify the temporary HMAC against the original HMAC to determine whether the host 302 provided a correct HMAC corresponding to the received data 308. Upon detecting a token error, the controller 325 can fail the write command 312 and generate a notification to the host 302.

In some examples, the following variations based on the granularity of the hash data can be used. In some examples, the host 302 may provide a cryptographic token for each unit of host data (e.g., for each LBA). In some examples, the host 302 may select a larger granularity for hash data, for example, 4 KB, 8 KB, 16 KB, 32 KB, 64 KB, 128 KB, 256 KB, etc.

In some examples, the host 302 may be configured to read in the same granularity as write, or the memory device 314 may implement the following algorithm variant if smaller writes are supported against large cryptographic writes. The memory device 314 can access all of the data having the cryptographic write size and validate all of it. The memory device 314 can then transfer only the requested data to the host 302. As an example, if the host uses a 128 KB granularity for a verified write command, the host can provide a cryptographic token for each 128 KB of specially written write data. If the host wishes to read 4 KB from within this range, the device internally reads and verifies the entire 128 KB as written against the 128 KB token, and then transfers the validated 4 KB as requested to the host. In this regard, the larger granularity may reduce the system overhead associated with storing and maintaining cryptographic tokens.

In some examples, the following variations may be used for how the hash data is stored in the memory device 314. In some examples, the hash data may be stored as an appendix to the LBA data. For example, a 128 KB write can be expanded to 132 KB to allow an extra 4 KB for storing cryptographic token(s) associated with the write data. In some examples, hash data may be stored in a secure internal storage portion of the memory array 328, such as a replay-protected memory block (RPMB). In some examples, the hash data may be stored in an internal private storage area of the memory array 328, such as together with other internal storage device data. In some examples, the hash data may be stored in a dedicated LBA range selected by the host 302.

In some examples, LBA data 308 that arrives at the memory device 314 with an original HMAC data 310 can be stored in a designated integrity protected area of the memory array 328, with the controller 325 maintaining a record of corresponding LBA or physical block address of the stored data for subsequent determination of whether the store data is integrity protected or not. In some examples, different integrity protected areas of the memory array 328 can be designated, with each area having a separate shared key that can be used for real-time integrity checking of the data.

In some examples, the original HMAC data 310 can be truncated to 64 bits according to NIST SP800-107, before the HMAC data is stored in the memory array 328.

In some examples, the host 302 and the memory device 314 can be configured to communicate using a Small Computer System Interface (SCSI) interface or a UFS interface. In this regard, the write command 312 can be communicated using a UFS protocol information unit (UPIU), and extended header segments within such UPIU can be used for communicating additional data such as the cryptographic tokens or hash data. As another option, UFS sector size can be increased (e.g., from 4096 bytes to 4104 bytes) to accommodate additional bytes (e.g., 8 bytes) of information for communication of the hash data (this approach may need JEDEC enablement and hardware modification, such as UFS 4.0 intercept).

Figure 4:
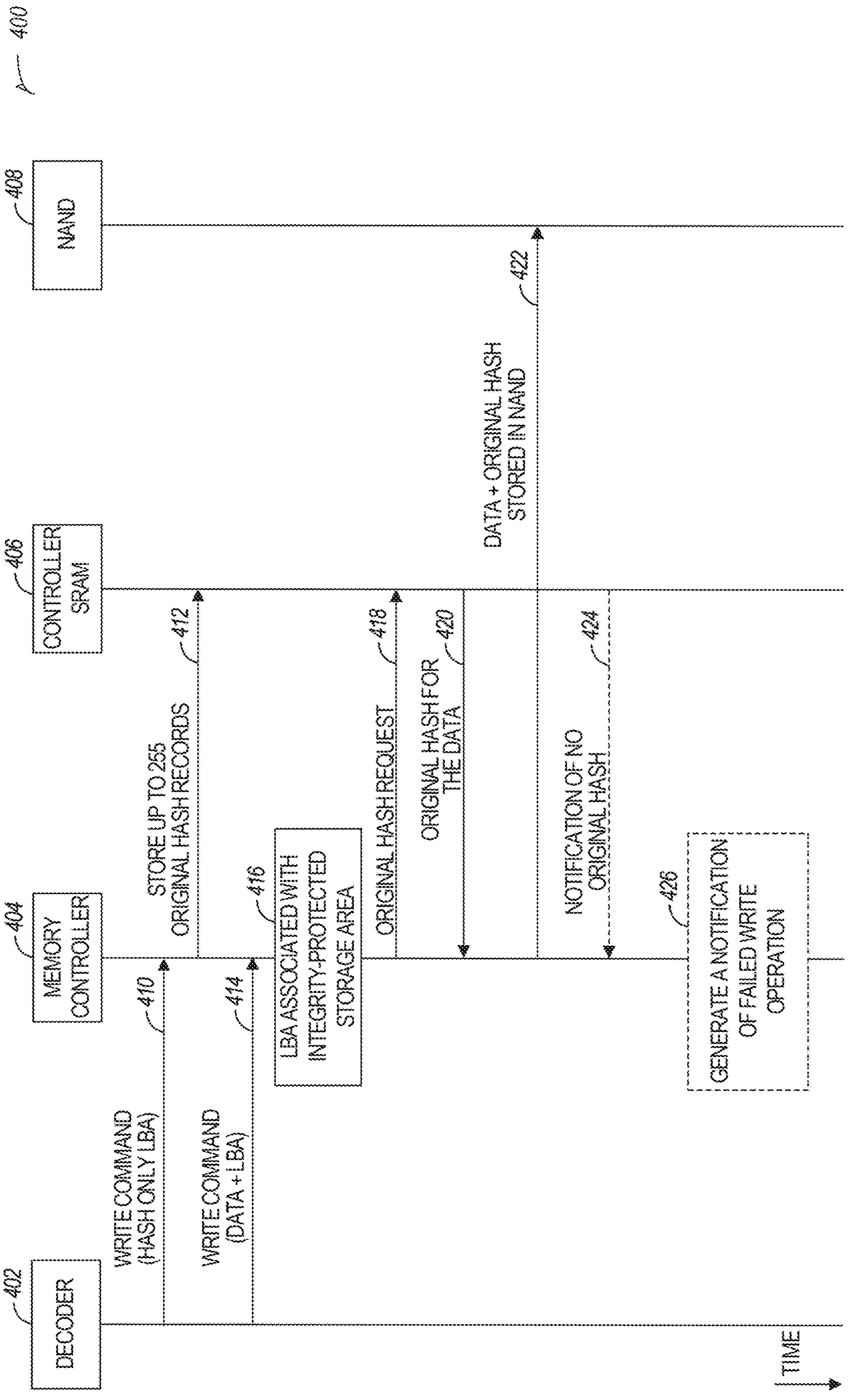
FIG. 4 is a swimlane diagram illustrating an example of component messaging within a memory device to process a write command with a hash only logical block address (LBA).

FIG. 4 is a swimlane diagram 400 illustrating an example of component messaging within a memory device to process a write command with a hash only LBA. Referring to FIG. 4, swimlane diagram 400 illustrates the communication of multiple hash records using a single LBA. The component messaging in FIG. 4 takes place between a decoder 402, a memory controller 404, controller memory 406, and memory array 408 (which can be the same as decoder 318, memory controller 325, controller memory 326, and memory array 328, respectively).

At operation 410, the decoder decodes and communicates to the memory controller 404 a write command with a single hash only LBA. A "hash only LBA" refers to a storage location into which only hash data can be stored. Details of the hash only LBA are provided in FIG. 5.

FIG. 5 is a block diagram illustrating an example hash only LBA 500, such as the LBA received in connection with FIG. 4. The hash only LBA 500 includes formatting data 502 (e.g., 16 bytes of formatting data, byte address 0x0 to 0xF) and hash data records 504, . . . , 506. The formatting data 502 can indicate a number of valid records or other formatting related data such as the correspondence of hash data to LBAs, which can be used to match subsequently arriving data to a corresponding hash from the hash data records 504, . . . , 506.

The hash data records 504, . . . , 506 includes multiple (e.g., 255) hash records, which can be applicable to subsequently received data at the memory device 314. Each of the hash data records 504, . . . , 506 includes a virtual address (VA) portion 508 (e.g., 4 bytes), a metadata portion 510 (e.g., 4 bytes), and an original hash portion 512 (e.g., 8 bytes) which includes an individual original hash generated by the host for a specific data record.

Referring back to FIG. 4, at operation 412, the memory controller 404 can store the individual hash data records from the hash only LBA at the controller memory 406. At operation 414, the decoder 402 decodes a new write command that includes LBA data. The memory controller 404, at operation 416, determines whether the LBA received at operation 414 is associated with an integrity-protected storage area of the memory array 408. More specifically, the LBA of the receive write command can be referenced against metadata from the multiple hash data records stored at the controller memory 406 to determine if there is a match or the LBA can be referenced to another record of LBAs that are associated with the integrity-protected storage area of the memory array 408. Upon determining that the LBA is associated with the integrity-protected storage area, at operation 418, the memory controller 404 communicates a request for the original hash of the LBA data to the controller memory 406. At operation 420, controller memory 406 communicates the original hash from the hash only LBA to the memory controller 404. At operation 422, the LBA data received at operation 414 and its corresponding original hash are stored in the memory array 408.

Upon determining that an original hash is not available for the LBA data, at operation 424, the controller memory 406 can communicate a notification that no original hash data from the hash only LBA is available for the LBA data received at operation 414. At operation 426, upon receiving a notification of no original hash data being available for the received LBA data, the memory controller 404 can generate a notification of a failed write operation.

FIG. 6 is a swimlane diagram 600 illustrating an example of component messaging within a memory device to process multiple write commands for storing LBA data and an original hash. The component messaging in FIG. 6 takes place between a decoder 602, memory controller 604, controller memory 606, and memory array 608 (which can be the same as decoder 318, memory controller 325, controller memory 326, and memory array 328 respectively). At operation 610, a first write command with original hash data is decoded/parsed by decoder 602 and communicated to memory controller 604. At operation 612, the memory controller 604 stores the original hash data in controller memory 606. Subsequently, at operation 614, the decoder decodes/parses a second write command that includes LBA data associated with the original hash data received with the first write command. At operation 616, the memory controller 604 retrieves the stored original hash data from the controller memory 606. At operation 618, the user data received with the second write command and the original hash data received with the first write command are stored (e.g., in an integrity-protected area of the memory array 328). For example, the user data can be stored in a user area 330 and the original hash data can be stored in a spare area 332 of the memory array 328.

FIG. 7 is a block diagram illustrating an example memory device configured to process a data read request with real-time time integrity checking. Referring to FIG. 7, the example environment 700 includes a host 702 and a memory device 710 configured for real-time integrity checking of data. The host 702 and the memory device 710 can be similar to the host 305 and the memory device 314 in FIG. 3, respectively. More specifically, the memory device 710 includes a host interface 712, a decoder 726, a memory controller 721, controller memory 724, and memory array 716 (e.g., NAND flash memory array), which are similar in functionality to the corresponding components of the memory device 314. The memory controller 721 includes a hash engine 720 and an error-correcting engine 718, which can be configured to perform similar functions as hash engine 324 and the error-correcting engine 322 of FIG. 3. The host interface 712, which is similar to host interface 316 of FIG. 3, provides a hardware communications medium between the memory device 710 and components of the host 702. The memory controller 721 can further include a logical-to-physical (L2P) address translation module 714, which is configured to perform address translation and generate a physical block address based on a received LBA.

In some examples, the following variations on how the read data integrity check is triggered can be used in the example environment 700. In some examples, integrity checking on read data is triggered via a custom command which explicitly triggers read measurement and reporting. In some examples, integrity checking on read data is triggered by the data itself based on a flag associated with the management data of the memory device 710 (for example, a bit in a logical-to-physical map table). In some examples, integrity checking on read data can be available once the host 702 has performed an authentication process with the memory device 710.

As illustrated in FIG. 7, a read command 706 with an LBA 708 is received at the memory device 710 from the host 702 through the host interface 712. The read command 706 can be communicated subsequent to the communication of a write command with data and a corresponding original hash. In this regard, the read command 706 can be for the previously stored data and the memory device 710 can perform real-time integrity checking of the data using the stored original hash and a newly generated, second hash. After the decoder 726 parses the received read command 706, the LBA 708 is translated by the L2P address translation module 714 to generate a physical block address (PBA) 728. The memory controller 721 can then access user data 730 from the memory array 716 based on the PBA 728. The error-correcting engine 718 can perform error correction on the user data 730 to generate error-corrected data (ECD) 734. The ECD 734 is communicated to the hash engine 720 for performing real-time integrity checking. In this regard, the hash engine 720 uses the shared key 704 (which has also been used by the host 702 to generate the original hash 732) and generates a new, second hash 736 based on the ECD 734. The hash engine 720 can retrieve the original hash 732 from the memory array 716 (or the original hash 732 can be communicated together with the ECD 734 to the hash engine 720) and can use a comparator 722 to compare the original hash 732 with the second hash 736.

Upon detecting a match between the original hash 732 and the second hash 736, the hash engine 720 communicates the ECD 734 for temporary storage in the controller memory 724 prior to communication of the ECD 734 to the host 702 via the interface 712, to complete the read command 706.

Upon detecting that the original hash 732 does not match the second hash 736, the memory controller 721 can generate a failure notification 738 which can be communicated back to the host 702 via the interface 712 in response to the read command 706. Optionally, the failure notification 738 can also include the ECD 734.

Figure 8:
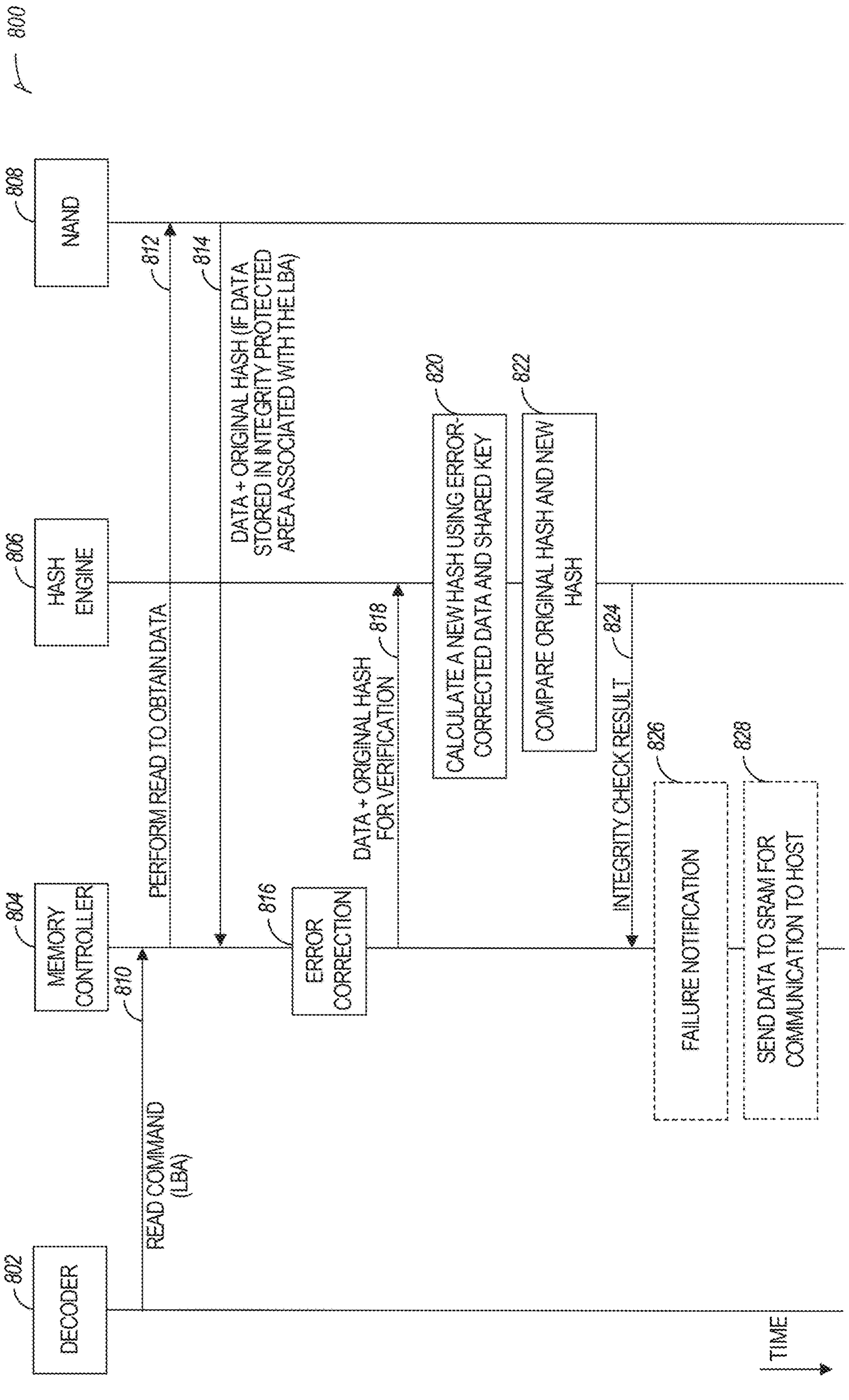
FIG. 8 is a swimlane diagram illustrating an example of component messaging within a memory device to process a read command with real-time integrity checking.

FIG. 8 is a swimlane diagram 800 illustrating an example of component messaging within a memory device to process a read command with real-time integrity checking. The component messaging in FIG. 8 takes place between a decoder 802, a memory controller 804, a hash engine 806, and a memory array 808 (which can be the same as decoder 726, memory controller 721, controller memory 724, and memory array 716, respectively). At operation 810, decoder 802 decode/parses a read command 706 with LBA 708 and communicates the command and LBA to the memory controller 804. At operation 812, the memory controller 804 performs a read in the memory array 808 to obtain the requested data (e.g., LBA to PBA translation can be performed by the address translation module 714). At operation 814, the user data 730 and the original hash 732 are communicated back to the memory controller 804 for an integrity check. Prior to the integrity check, at operation 816, error correction can be performed to generate error-corrected data (e.g., ECD 734). At operation 818, the ECD 734 and the original hash 732 are communicated to the hash engine 806. At operation 820, the hash engine 806 calculates a new hash using the ECD 734 and the shared key 704. At operation 822, the hash engine 806 uses the comparator 722 and compare the original hash 732 with the new hash 736 to perform the integrity check. At operation 824, the integrity check result is communicated to the memory controller 804. Upon detecting that the new hash 736 does not match the original hash 732, a failure notification is generated at operation 826 for communication to the host 702. Upon detecting that the new hash 736 matches the original hash 732, the ECD 734 can be sent to the controller memory 724 at operation 828 for temporary storage before communication to the host 702 in response to the read command 706.

Figure 9:
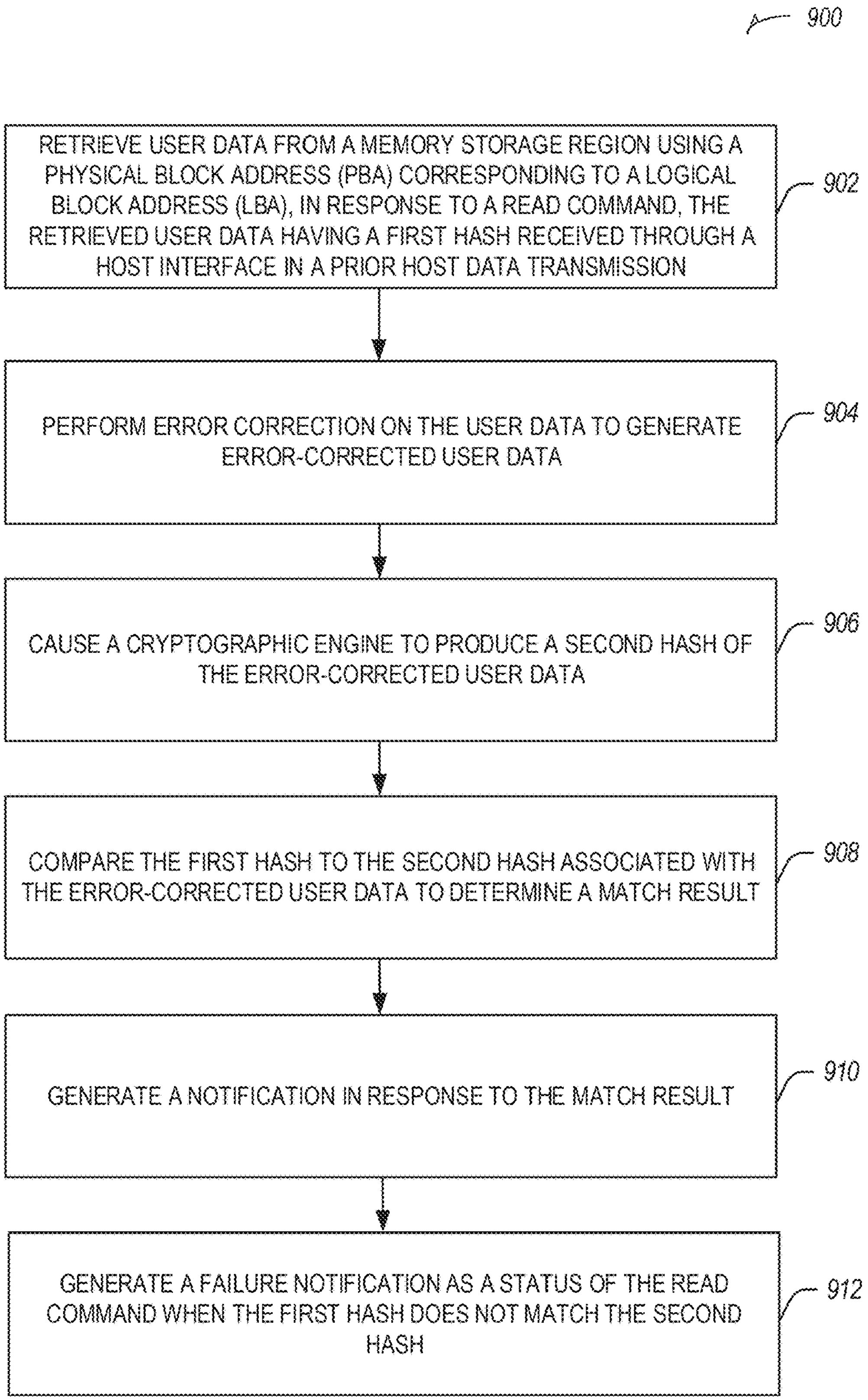
FIG. 9 is a flow diagram of an example of a method for real-time integrity checking of data in response to a read command.

FIG. 9 is a flow diagram of an example of a method 900 for real-time integrity checking of data in response to a read command. Referring to FIG. 9, method 900 includes operations 902, 904, 906, 908, 910, and 912, which can be performed by components of the memory device 710 (e.g., the memory controller 721). A read command and an LBA received at a storage device through a host interface are parsed. For example, decoder 726 parses the read command 706 with an LBA 708. At operation 902, user data is retrieved from a memory storage region using a physical block address (PBA) corresponding to the LBA in response to the read command. For example, the address translation module 714 translates LBA 708 to generate a physical block address 728 which is used to retrieve user data 730. The retrieved user data 730 is associated with a first hash received through the host interface in a prior host data transmission. For example, user data 730 is associated with a first hash 732 that is received with a prior host transmission (e.g., communication of the write command 312 in FIG. 3).

At operation 904, error correction is performed on the user data to generate error-corrected user data. For example, the error-correcting engine 718 performs error correction on data 732 to generate error-corrected data 734. At operation 906, the cryptographic engine of the storage device produces a second hash of the error-corrected user data. For example, the hash engine 720 generates a second hash 736 using the error-corrected data 734 and the shared key 704. At operation 908, the first hash is compared to the second hash associated with the error-corrected user data to determine a match result. For example, the comparator 722 within the hash engine 720 performs the comparison between the original, first hash 732 and the second hash 736 to determine whether there is a match. At operation 910, a notification is generated in response to the match result. For example, if there is a match, the error-corrected data 734 is buffered in the controller memory 724 prior to communication to the host 702 in response to the read command 706. If there is no match, a failure notification 738 is communicated to the host 702, which may optionally include the error-corrected data 734.

At operation 912, a failure notification is generated as a status of the read command when the first hash does not match the second hash.

Figure 10:
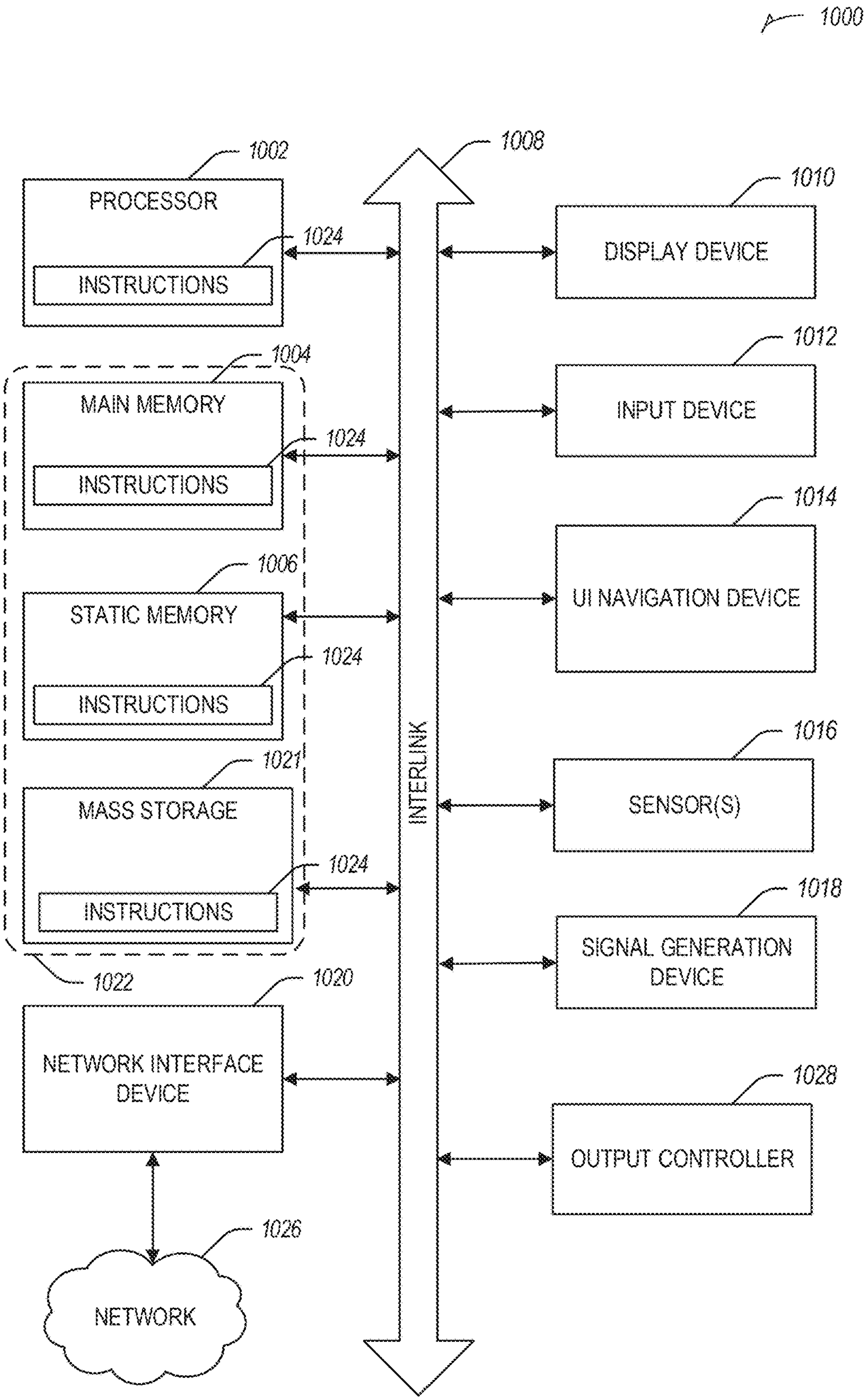
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example embodiment, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1000 (e.g., the host device 105, the memory device 110, etc.) may include a hardware processor 1002 (e.g., a CPU, a graphics processing unit (GPU), a hardware processor core, or any combination thereof, such as the memory controller 115, etc.), a main memory 1004, and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012, and UI navigation device 1014 may be a touch screen display. The machine 1000 may additionally include a signal generation device 1018 (e.g., a speaker), a network interface device 1020, and one or more sensors 1016, such as a global positioning system (GPS) sensor, compass, accelerometer, or other sensors. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The machine 1000 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, or the static memory 1006 may constitute the machine-readable medium 1022.

While the machine-readable medium 1022 is illustrated as a single medium, the term "machine-readable medium" may include a single medium or multiple media (e.g., a centralized or distributed database, or associated caches and servers) configured to store the one or more instructions 1024.

The term "machine-readable medium" may include any medium capable of storing or encoding instructions for execution by the machine 1000 and that cause the machine 1000 to perform any one or more of the techniques of the present disclosure, or capable of storing, encoding or carrying data structures used by or associated with such instructions. Non-limiting machine-readable medium examples include solid-state memories and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., EPROM, EEPROM) and flash memory devices; magnetic disks, such as internal hard disks and removable disks; magneto-optical disks; and CD-ROM and DVD-ROM disks.

The instructions 1024 (e.g., software, programs, an operating system (OS), etc.) or other data are stored on the storage device 1021 and can be accessed by the memory 1004 for use by the processor 1002. The memory 1004 (e.g., DRAM) is typically fast, but volatile, and thus a different type of storage than the storage device 1021 (e.g., an SSD), which is suitable for long-term storage, including while in an "off" condition. The instructions 1024 or data in use by a user or the machine 1000 are typically loaded in the memory 1004 for use by the processor 1002. When the memory 1004 is full, virtual space from the storage device 1021 can be allocated to supplement the memory 1004; however, because the storage 1021 device is typically slower than the memory 1004, and write speeds are typically at least twice as slow as read speeds, use of virtual memory can greatly reduce user experience due to storage device latency (in contrast to the memory 1004, e.g., DRAM). Further, the use of the storage device 1021 for virtual memory can greatly reduce the usable lifespan of the storage device 1021.

In contrast to virtual memory, virtual memory compression (e.g., the Linux® kernel feature "ZRAM") uses part of the memory as compressed block storage to avoid paging to the storage device 1021. Paging takes place in the compressed block until it is necessary to write such data to the storage device 1021. Virtual memory compression increases the usable size of memory 1004 while reducing wear on the storage device 1021.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial SATA™ based SSD devices. However, demand for mobile device performance continues to increase, such as to fully enable virtual or augmented-reality devices, utilize increasing network speeds, etc. In response to this demand, storage devices have shifted from parallel to serial communication interfaces. UFS devices, including controllers and firmware, communicate with a host device using a low-voltage differential signaling (LVDS) serial interface with dedicated read/write paths, further advancing greater read/write speeds.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding or carrying instructions for execution by the machine 1000, and includes digital or analog communications signals or another intangible medium to facilitate communication of such software.

Additional Notes and Examples

To better illustrate the methods and apparatuses described herein, a non-limiting set of Example embodiments are set forth below as numerically identified Examples.

Example 1 is a storage device that implements cryptographic validity checking, the storage device comprising: a memory storage region; a cryptographic engine; a host interface; a decoder configured to parse a read command and a logical block address (LBA) received through the host interface; and a controller having a processor configured to execute instructions stored on the storage device, wherein the instructions, when executed by the processor, cause the processor to perform operations, comprising: retrieve user data from the memory storage region using a physical block address corresponding to the LBA, in response to the read command, the retrieved user data having a first hash received through the host interface in a prior host data transmission; perform error correction on the user data to generate error-corrected user data; causing the cryptographic engine to produce a second hash of the error-corrected user data; compare the first hash to the second hash associated with the error-corrected user data to determine a match result; and generate a notification in response to the match result.

In Example 2, the subject matter of Example 1 includes, wherein executing the instructions causes the processor to perform operations, comprising: detecting whether the memory storage region is an integrity-protected memory region, based on the LBA received through the host interface; and on detecting that the memory storage region is an integrity-protected memory region, causing the cryptographic engine to produce the second hash of the error-corrected user data.

In Example 3, the subject matter of Examples 1-2 includes, wherein the decoder is to parse a write command from the prior host data transmission, the prior host data transmission including the user data and the first hash.

In Example 4, the subject matter of Example 3 includes, wherein the controller is to perform the write command to store the user data and the first hash in the memory storage region.

In Example 5, the subject matter of Example 4 includes, wherein the first hash is stored in a spare area of the memory storage region.

In Example 6, the subject matter of Examples 4-5 includes, wherein the user data is stored in a user area of the memory storage region, and the first hash is stored in the user area using a pre-defined offset from the user data.

In Example 7, the subject matter of Example 6 includes, wherein the first hash is stored in an inaccessible user data portion of the user area.

In Example 8, the subject matter of Examples 1-7 includes, wherein the controller is to: generate a failure notification as a status of the read command, when the first hash does not match the second hash.

In Example 9, the subject matter of Examples 1-8 includes, wherein the controller is to: store the error-corrected user data in a buffer for communication to the host, when the first hash matches the second hash.

In Example 10, the subject matter of Examples 1-9 includes, wherein the controller is to: perform logical-to-physical address translation of the LBA to obtain the physical block address corresponding to the LBA.

In Example 11, the subject matter of Examples 1-10 includes, wherein the cryptographic engine produces the second hash of the error-corrected user data using a cryptographic key shared with the host.

In Example 12, the subject matter of Example 11 includes, wherein the first hash is generated by the host using the cryptographic key.

In Example 13, the subject matter of Examples 1-12 includes, wherein the controller is to: execute a first write command parsed by the decoder from a first prior host data transmission received at the interface, to store the user data in the memory storage region; and execute a second write command parsed by the decoder from a second prior host data transmission received at the interface, to store the first hash in the memory storage region.

In Example 14, the subject matter of Example 13 includes, wherein the user data is included in the first prior host data transmission, and the first hash is included in the second prior host data transmission.

In Example 15, the subject matter of Examples 1-14 includes, wherein the first hash and the second hash include a keyed-hash message authentication code (HMAC).

In Example 16, the subject matter of Examples 1-15 includes, wherein the host interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

In Example 17, the subject matter of Examples 1-16 includes, wherein the memory storage region comprises one or more flash memory die.

In Example 18, the subject matter of Example 17 includes, wherein the one or more flash memory die includes NAND flash memory cells.

Example 19 is a method, comprising: parsing a read command and a logical block address (LBA) received at a storage device through a host interface; retrieving at the storage device, user data from a memory storage region using a physical block address corresponding to the LBA, in response to the read command, the retrieved user data having a first hash received through the host interface in a prior host data transmission; performing error correction on the user data to generate error-corrected user data; causing a cryptographic engine of the storage device to produce a second hash of the error-corrected user data; comparing the first hash to the second hash associated with the error-corrected user data to determine a match result; and generating a notification in response to the match result.

In Example 20, the subject matter of Example 19 includes, detecting whether the memory storage region is an integrity-protected memory region, based on the LBA received through the host interface; and on detecting that the memory storage region is an integrity-protected memory region, causing the cryptographic engine to produce the second hash of the error-corrected user data.

In Example 21, the subject matter of Examples 19-20 includes, parsing a write command from the prior host data transmission, the prior host data transmission including the user data and the first hash.

In Example 22, the subject matter of Example 21 includes, performing the memory write command to store the user data and the first hash in the memory storage region.

In Example 23, the subject matter of Example 22 includes, wherein the first hash is stored in a spare area of the memory storage region.

In Example 24, the subject matter of Examples 22-23 includes, wherein the user data is stored in a user area of the memory storage region, and the first hash is stored in the user area using a pre-defined offset from the user data.

In Example 25, the subject matter of Example 24 includes, wherein the first hash is stored in an inaccessible user data portion of the user area.

In Example 26, the subject matter of Examples 19-25 includes, generating a failure notification as a status of the read command, when the first hash does not match the second hash.

In Example 27, the subject matter of Examples 19-26 includes, storing the error-corrected user data in a buffer for communication to the host, when the first hash matches the second hash.

In Example 28, the subject matter of Examples 19-27 includes, performing logical-to-physical address translation of the LBA to obtain the physical block address corresponding to the LBA.

In Example 29, the subject matter of Examples 19-28 includes, wherein the cryptographic engine produces the second hash of the error-corrected user data using a cryptographic key shared with the host.

In Example 30, the subject matter of Example 29 includes, wherein the first hash is generated by the host using the cryptographic key.

In Example 31, the subject matter of Examples 19-30 includes, executing a first write command parsed by the decoder from a first prior host data transmission received at the interface, to store the user data in the memory storage region; and executing a second write command parsed by the decoder from a second prior host data transmission received at the interface, to store the first hash in the memory storage region.

In Example 32, the subject matter of Example 31 includes, wherein the user data is included in the first prior host data transmission, and the first hash is included in the second prior host data transmission.

In Example 33, the subject matter of Examples 19-32 includes, wherein the first hash and the second hash include a keyed-hash message authentication code (HMAC).

In Example 34, the subject matter of Examples 19-33 includes, wherein the host interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

In Example 35, the subject matter of Examples 19-34 includes, wherein the memory storage region comprises one or more flash memory die.

In Example 36, the subject matter of Example 35 includes, wherein the one or more flash memory die includes NAND flash memory cells.

Example 37 is a machine-readable medium, comprising instructions, which when executed by a processor of a storage device, cause the processor to perform operations comprising: parsing a read command and a logical block address (LBA) received at the storage device through a host interface; retrieving at the storage device, user data from a memory storage region using a physical block address corresponding to the LBA, in response to the read command, the retrieved user data having a first hash received through the host interface in a prior host data transmission; performing error correction on the user data to generate error-corrected user data; causing a cryptographic engine of the storage device to produce a second hash of the error-corrected user data; comparing the first hash to the second hash associated with the error-corrected user data to determine a match result; and generating a notification in response to the match result.

In Example 38, the subject matter of Example 37 includes, wherein the processor further performs operations comprising: detecting whether the memory storage region is an integrity-protected memory region, based on the LBA received through the host interface; and on detecting that the memory storage region is an integrity-protected memory region, causing the cryptographic engine to produce the second hash of the error-corrected user data.

In Example 39, the subject matter of Examples 37-38 includes, wherein the processor further performs operations comprising: parsing a write command from the prior host data transmission, the prior host data transmission including the user data and the first hash.

In Example 40, the subject matter of Example 39 includes, wherein the processor further performs operations comprising: performing the memory write command to store the user data and the first hash in the memory storage region.

In Example 41, the subject matter of Example 40 includes, wherein the first hash is stored in a spare area of the memory storage region.

In Example 42, the subject matter of Examples 40-41 includes, wherein the user data is stored in a user area of the memory storage region, and the first hash is stored in the user area using a pre-defined offset from the user data.

In Example 43, the subject matter of Example 42 includes, wherein the first hash is stored in an inaccessible user data portion of the user area.

In Example 44, the subject matter of Examples 37-43 includes, wherein the processor further performs operations comprising: generating a failure notification as a status of the read command, when the first hash does not match the second hash.

In Example 45, the subject matter of Examples 37-44 includes, wherein the processor further performs operations comprising: storing the error-corrected user data in a buffer for communication to the host, when the first hash matches the second hash.

In Example 46, the subject matter of Examples 37-45 includes, wherein the processor further performs operations comprising: performing logical-to-physical address translation of the LBA to obtain the physical block address corresponding to the LBA.

Example 47 is a system, comprising: means for parsing a read command and a logical block address (LBA) received at a storage device through a host interface; means for retrieving at the storage device, user data from a memory storage region using a physical block address corresponding to the LBA, in response to the read command, the retrieved user data having a first hash received through the host interface in a prior host data transmission; means for performing error correction on the user data to generate error-corrected user data; means for causing a cryptographic engine of the storage device to produce a second hash of the error-corrected user data; means for comparing the first hash to the second hash associated with the error-corrected user data to determine a match result; and means for generating a notification in response to the match result.

In Example 48, the subject matter of Example 47 includes, means for detecting whether the memory storage region is an integrity-protected memory region, based on the LBA received through the host interface; and means for, on detecting that the memory storage region is an integrity-protected memory region, causing the cryptographic engine to produce the second hash of the error-corrected user data.

In Example 49, the subject matter of Examples 47-48 includes, means for parsing a write command from the prior host data transmission, the prior host data transmission including the user data and the first hash.

In Example 50, the subject matter of Example 49 includes, means for performing the memory write command to store the user data and the first hash in the memory storage region.

In Example 51, the subject matter of Example 50 includes, wherein the first hash is stored in a spare area of the memory storage region.

In Example 52, the subject matter of Examples 50-51 includes, wherein the user data is stored in a user area of the memory storage region, and the first hash is stored in the user area using a pre-defined offset from the user data.

In Example 53, the subject matter of Example 52 includes, wherein the first hash is stored in an inaccessible user data portion of the user area.

In Example 54, the subject matter of Examples 47-53 includes, means for generating a failure notification as a status of the read command, when the first hash does not match the second hash.

In Example 55, the subject matter of Examples 47-54 includes, means for storing the error-corrected user data in a buffer for communication to the host, when the first hash matches the second hash.

In Example 56, the subject matter of Examples 47-55 includes, means for performing logical-to-physical address translation of the LBA to obtain the physical block address corresponding to the LBA.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above-detailed description includes references to the accompanying drawings, which form a part of the detailed description. The drawings show, by way of illustration, specific embodiments in which the disclosed techniques can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more examples thereof), either with respect to a particular example (or one or more examples thereof) or with respect to other examples (or one or more examples thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, i.e., a system, device, article, or process that includes elements in addition to those listed after such a term in a claim are still deemed to fall within the scope of that claim. Moreover, in the following claims, the terms "first," "second," "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a DSP, or any other type of processor or processing circuit, including a group of processors or multi-core devices.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

Operating a memory cell, as used herein, includes reading from, writing to, or erasing the memory cell. The operation of placing a memory cell in an intended state is referred to herein as "programming" and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.).

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to," or "coupled with" another element, it can be directly on, connected, or coupled with the other element or intervening elements may be present. In contrast, when an element is referred to as being "directly on," "directly connected to," or "directly coupled with" another element, there are no intervening elements or layers present. If two elements are shown in the drawings with a line connecting them, the two elements can be either be coupled or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code can be tangibly stored on one or more volatile or non-volatile tangible computer-readable media, such as during execution or at other times. Examples of these tangible computer-readable media can include but are not limited to, hard disks, removable magnetic disks, removable optical disks (e.g., compact discs and digital video disks), magnetic cassettes, memory cards or sticks, RAMs, ROMs, SSDs, UFS devices, eMMC devices, etc.

The above description is intended to be illustrative, and not restrictive. For example, the above-described examples (or one or more examples thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, the inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A storage device that implements cryptographic validity checking, the storage device comprising:

a memory storage region; and a controller coupled to controller memory and the memory storage region, the controller having a processor configured to execute instructions stored on the storage device, wherein the instructions, when executed by the processor, cause the processor to perform operations comprising:

decoding at least one write command received from a host to obtain user data;

parsing a plurality of hash records stored in the controller memory to determine a hash record of the plurality of hash records that is associated with the user data;

retrieving the hash record from the controller memory; and storing the hash record and the user data in the memory storage region.

2. The storage device of claim 1, wherein the operations associated with the decoding of the at least one write command comprise:

decoding a first write command received from the host to obtain the plurality of hash records.

3. The storage device of claim 2, wherein the operations comprise:
storing the plurality of hash records in the controller memory; and
decoding a second write command received from the host to obtain the user data.

4. The storage device of claim 2, wherein the operations comprise:
decoding the first write command to obtain logical block address (LBA) data, wherein the LBA data comprises the plurality of hash records associated with a corresponding plurality of hashes, and wherein the hash record of the plurality of hash records includes a hash of the user data and an LBA.

5. The storage device of claim 4, wherein the operations comprise:
obtaining an LBA of the user data based on decoding a second write command.

6. The storage device of claim 5, wherein the operations comprise:
retrieving the hash record from the controller memory based on matching the LBA of the user data with the LBA in the hash record.

7. The storage device of claim 6, wherein the operations comprise:
generating a notification of an execution status of the at least one write command, the execution status based on a successful completion of the matching.

8. A method comprising:
decoding, by at least one hardware processor of a storage device, at least one write command received from a host to obtain user data;
parsing a plurality of hash records stored in controller memory to determine a hash record of the plurality of hash records that is associated with the user data;
retrieving the hash record from the controller memory; and
storing the hash record and the user data in a memory storage region of the storage device.

9. The method of claim 8, wherein the decoding of the at least one write command comprises:
decoding a first write command received from the host to obtain the plurality of hash records.

10. The method of claim 9, further comprising:
storing the plurality of hash records in the controller memory; and
decoding a second write command received from the host to obtain the user data.

11. The method of claim 9, further comprising:
decoding the first write command to obtain logical block address (LBA) data, wherein the LBA data comprises the plurality of hash records associated with a corresponding plurality of hashes, and wherein the hash record of the plurality of hash records includes a hash of the user data and an LBA.

12. The method of claim 11, further comprising:
obtaining an LBA of the user data based on decoding a second write command.

13. The method of claim 12, further comprising:
retrieving the hash record from the controller memory based on matching the LBA of the user data with the LBA in the hash record.

14. The method of claim 13, further comprising:
generating a notification of an execution status of the at least one write command, the execution status based on a successful completion of the matching.

15. A machine-readable medium, comprising instructions, which when executed by a processor of a storage device, cause the processor to perform operations comprising:
decoding at least one write command received from a host to obtain user data;
parsing a plurality of hash records stored in controller memory to determine a hash record of the plurality of hash records that is associated with the user data;
retrieving the hash record from the controller memory; and
storing the hash record and the user data in a memory storage region of the storage device.

16. The machine-readable medium of claim 15, wherein the operations associated with the decoding of the at least one write command comprise:
decoding a first write command received from the host to obtain the plurality of hash records.

17. The machine-readable medium of claim 16, the operations further comprising:
storing the plurality of hash records in the controller memory; and
decoding a second write command received from the host to obtain the user data.

18. The machine-readable medium of claim 16, the operations further comprising:
decoding the first write command to obtain logical block address (LBA) data, wherein the LBA data comprises the plurality of hash records associated with a corresponding plurality of hashes, and wherein the hash record of the plurality of hash records includes a hash of the user data and an LBA.

19. The machine-readable medium of claim 18, the operations further comprising:
obtaining an LBA of the user data based on decoding a second write command.

20. The machine-readable medium of claim 19, the operations further comprising:
retrieving the hash record from the controller memory based on matching the LBA of the user data with the LBA in the hash record; and
generating a notification of an execution status of the at least one write command, the execution status based on a successful completion of the matching.

* * * * *